(12) United States Patent
Asano et al.

(10) Patent No.: US 7,540,459 B2
(45) Date of Patent: Jun. 2, 2009

(54) MOBILE DEVICE CLAMP HOLDER WITH DAMPED RELEASE MECHANISM

(75) Inventors: Mitsuhiro Asano, Osaka (JP); Yasuhiro Yamamoto, Osaka (JP); Michael Göllnitz, Neu-Ulm (DE)

(73) Assignee: Nokia Corporation, Epsoo (FI)

( * ) Notice: Subject to any disclaimer, the term of this patent is extended or adjusted under 35 U.S.C. 154(b) by 318 days.

(21) Appl. No.: 11/463,457

(22) Filed: Aug. 9, 2006

(65) Prior Publication Data

US 2007/0045495 A1 Mar. 1, 2007

(30) Foreign Application Priority Data

Aug. 26, 2005 (DE) .................. 20 2005 013 523 U

(51) Int. Cl.
*A47F 5/00* (2006.01)

(52) U.S. Cl. ................. 248/309.1; 248/316.4; 379/446; 379/455

(58) Field of Classification Search ............. 248/316.4, 248/316.1, 309.1, 231.21; 224/929; 379/446, 379/455; 455/569.2

See application file for complete search history.

(56) References Cited

U.S. PATENT DOCUMENTS

| | | | | |
|---|---|---|---|---|
| 5,305,381 A | * | 4/1994 | Wang et al. ................. 379/455 |
| 5,555,302 A | * | 9/1996 | Wang .......................... 379/446 |
| 5,694,468 A | * | 12/1997 | Hsu ............................ 379/446 |
| 5,788,202 A | * | 8/1998 | Richter .................... 248/316.4 |
| 6,073,901 A | * | 6/2000 | Richter .................... 248/316.4 |
| 6,256,387 B1 | * | 7/2001 | Wang .......................... 379/446 |
| 6,980,836 B1 | * | 12/2005 | Skiles ..................... 455/569.2 |
| 7,080,812 B2 | * | 7/2006 | Wadsworth et al. ...... 248/316.6 |
| 2002/0190176 A1 | * | 12/2002 | Louh ....................... 248/316.4 |
| 2006/0278788 A1 | * | 12/2006 | Fan .......................... 248/309.1 |

\* cited by examiner

*Primary Examiner*—Ramon O Ramirez
(74) *Attorney, Agent, or Firm*—Locke Lord Bissell & Liddell LLP

(57) ABSTRACT

A holder for a mobile electronic device includes first and second clamping jaws, at least the first clamping jaw being displaceable toward the second clamping jaw to clamp the mobile electronic device. The holder also includes a stop element and an entraining element connected to the first clamping jaw, the entraining element being shaped so that it is displaceable with respect to the stop element, namely jointly with the clamping jaw connected to it, in which case at least one extreme position corresponding to the maximum opening of the clamping jaw is defined in the displacement path by the impact of the stop element against the entraining element. The holder includes a damper element, which is mounted on the stop element and damps the stopping of the stop element against the entraining element.

20 Claims, 2 Drawing Sheets

MOBILE DEVICE CLAMP HOLDER WITH DAMPED RELEASE MECHANISM

TECHNICAL FIELD

The present invention relates to a holder for mobile electronic devices, in particular cellular telephones, e.g., for installation in motor vehicles.

BACKGROUND

Holders for mobile electronic devices are becoming widespread, e.g., for securely holding a cellular telephone in a motor vehicle. Two points are naturally important here. First, the cellular telephone must be restrained securely so that it is held reliably despite the acceleration that occurs when driving a vehicle. Secondly, the simplest possible handling of the holder is required. In other words, the user should be able to easily place the telephone in the holder and remove it from the holder, preferably using only one hand.

There are known holders with which the device is secured by spring-loaded clamping jaws, i.e., the spring force holds the device between the clamping jaws. Although this approach is easy to implement and works satisfactorily with regard to securing the device, operation is difficult. As a rule, two hands are needed to place a device in the holder and remove it from the holder, i.e., at least one hand to hold the device and one hand to open the clamping jaws; in the worst case, two hands are needed to open the clamping jaws.

Therefore, conversely, holders with which the spring force causes the jaws to be forced apart have also been developed. This requires a mechanism which allows the clamping jaws to be pressed together until they hold the device securely and then lock them in this position, thereby preventing unintentional opening. Then the lock can be released by a release button or the like so that the clamping jaws are forced apart by the spring force and thereby release the device.

The mechanism is constructed so that the clamping jaws can be opened only to a certain degree, i.e., a type of stop is provided. Since the spring or corresponding elastic element must be designed to be strong enough for the clamping jaws to be reliably forced apart when unlocked, this stop is exposed to an increased load when it absorbs the shocks of the clamping jaws as they spring open.

The necessarily forceful impact against the stop causes unwanted noise, and there is a risk of damage to the stop in the long run, so it no longer functions properly (e.g., breaking off). The durability of the entire holder, which is made of plastic, for example, may be impaired due to heavy vibrations (causing cracks, etc.). Sudden impact against the stop when the clamping jaws spring open is therefore undesirable, because this not only shortens the lifetime of the holder but the loud noise also gives the user the impression of low-quality workmanship.

SUMMARY OF THE INVENTION

The object of the present invention is therefore to provide an improved holder with which the disadvantages mentioned above are eliminated.

According to one aspect of the present invention, a holder for a mobile electronic device is provided, comprising:
  a base element;
  a first and a second clamping jaw, each being mounted on opposing sides of the base element, at least the first clamping jaw being displaceable toward the second clamping jaw to clamp the mobile electronic device between the clamping jaws;
  an elastic element connected at least to the first clamping jaw, its spring force being effective in forcing the first clamping jaw away from the second clamping jaw;
  a locking mechanism which is adapted for locking the clamping jaws in various positions with respect to displacement in relation to one another;
  a release element adapted for releasing the lock;
  a stop element; and
  an entraining element connected to the first clamping jaw.

The entraining element is shaped so that it is displaceable with respect to the stop element, namely jointly with the clamping jaw connected to it, in which case at least one extreme position corresponding to the maximum opening of the clamping jaws is defined in the displacement path by the impact of the stop element against the entraining element. The holder includes a damper element, which is mounted on the stop element and damps the stopping of the stop element against the entraining element.

The lifetime of the holder is increased by such a holder which eliminates or at least reduces the noise nuisance when the holding mechanism is released while at the same time giving the user an impression of higher quality.

In one exemplary embodiment, the second clamping jaw is also displaceable against the first clamping jaw and the holder also comprises:
  a second stop element;
  a second entraining element which is connected to the second clamping jaw, wherein the second entraining element is displaceable with respect to the second stop element and is designed so that at least one extreme position, which corresponds to the maximum opening of the clamping jaw, is defined by the stopping of the second stop element against the second entraining element, and
  a second damper element which is mounted on the second stop element and damps a stopping of the second stop element against the second entraining element.

In one exemplary embodiment, at least one entraining element has a recess in which the corresponding stop element engages. The recess may be an elongated hole and the stop may be a tubular pin.

In one exemplary embodiment, the holder also includes:
  pad elements mounted on the insides of the clamping jaws to protect a mobile electronic device held between the clamping jaws.

This prevents scratches, etc., on the housing of the device, and the pads may also serve to improve the holding of the device, e.g., by using pads having elastic properties and a slip-proof surface.

In one exemplary embodiment, the holder also includes:
  at least one holding element which is mounted on the base element to prevent a mobile electronic device being held thereby from falling out.

Such a holding element also serves as a stop for the device before the clamping jaws are closed, so that no hands are needed to hold the device.

In one exemplary embodiment, the damper element(s) consist(s) of elastomer element(s).

In one exemplary embodiment, at least one entraining element is shaped so that another extreme position, corresponding to the minimum opening of the corresponding clamping jaw, in the displacement path is defined by the stopping of the respective stop element on the entraining element. The advantage of this embodiment is explained further in the detailed description.

In one exemplary embodiment, the damper element(s) is (are) in frictional engagement with the entraining element over at least a portion of the displacement path. This allows additional damping and retardation of the movement of the clamping jaws to be achieved, at least in the vicinity of the extreme position, which then corresponds to the maximally opened clamping jaws.

DETAILED DESCRIPTION OF THE INVENTION

Figure 1:
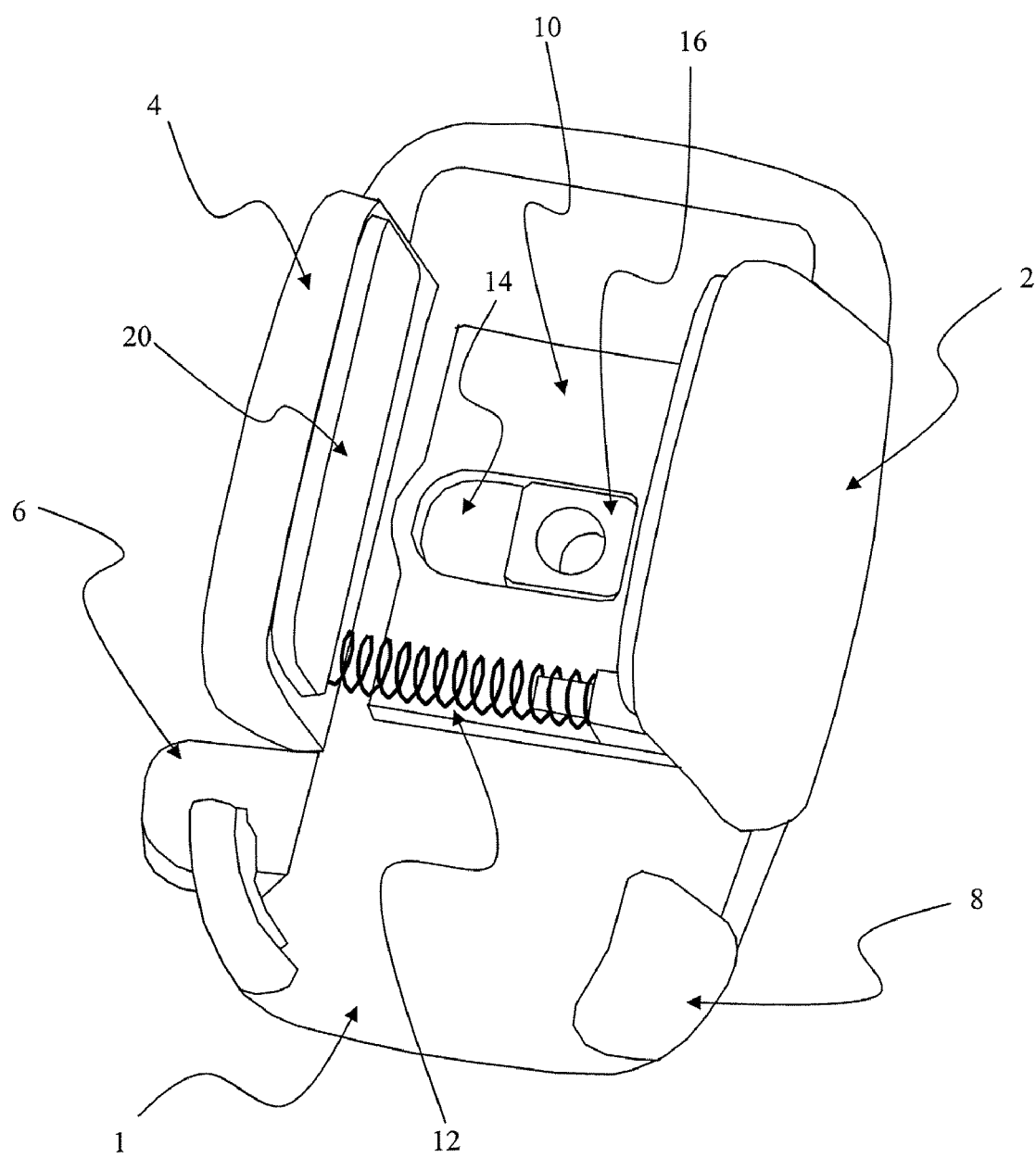
FIG. 1 shows an exemplary embodiment of the present invention in a frontal view.

FIG. 1 shows an exemplary embodiment of the holder of the present invention in a view from the front. Clamping jaws 2, 4 are mounted on a housing or a base plate. The clamping jaws 2, 4 are movably mounted so that they can secure a device (not shown) that is placed in the holder, i.e., they are movable horizontally toward and away from the device. Pads 20 are preferably provided on the clamping jaws 2, 4 to hold the device securely without damaging and/or scratching it.

The clamping jaws 2, 4 are forced apart by a spring 12 or a corresponding elastic element. A mechanism (not shown) ensures that the clamping jaws 2, 4 are locked, e.g., by means of a suitable catch mechanism, to prevent them from moving apart. A release lever 6 serves to unlock this catch, so that the spring 12 can move the clamping jaws 2, 4 away from the device (not shown) that is placed in the device. Lower holding tongues 8 are provided to form a lower support for a device placed in the device.

An entraining element in the form of a plate 10 is connected to one of the clamping jaws. The plate 10 has a recess 14 in which a stop element fixedly attached to the base plate engages. The recess 14 is of dimensions such that the plates 10 can be pushed with respect to the stop in a certain area. The stop for the clamping jaw connected to the plate 10 defines two maximum positions that are selected so that a device placed in the holder is held securely and can be removed easily. According to this invention, the stop is provided with a damper 16, e.g., an elastomer disk. In this way, the stop has an elastic shock-absorbing or decelerating effect, at least in the maximum position, corresponding to the opened clamping jaws 2, 4, thereby preventing a hard stop.

The damper 16 may also be provided, so that it can provide additional elasticity in the other maximum position, corresponding to closed clamping jaws (depending on the width of the device to be accommodated). In other words, a slight play is allowed in the clamping jaws, e.g., to support the catch mechanism in moving to the next catch position, whereby the clamping jaws are pressed against the device placed in the holder due to the elasticity of the damper element and/or its low recoil.

Figure 2:
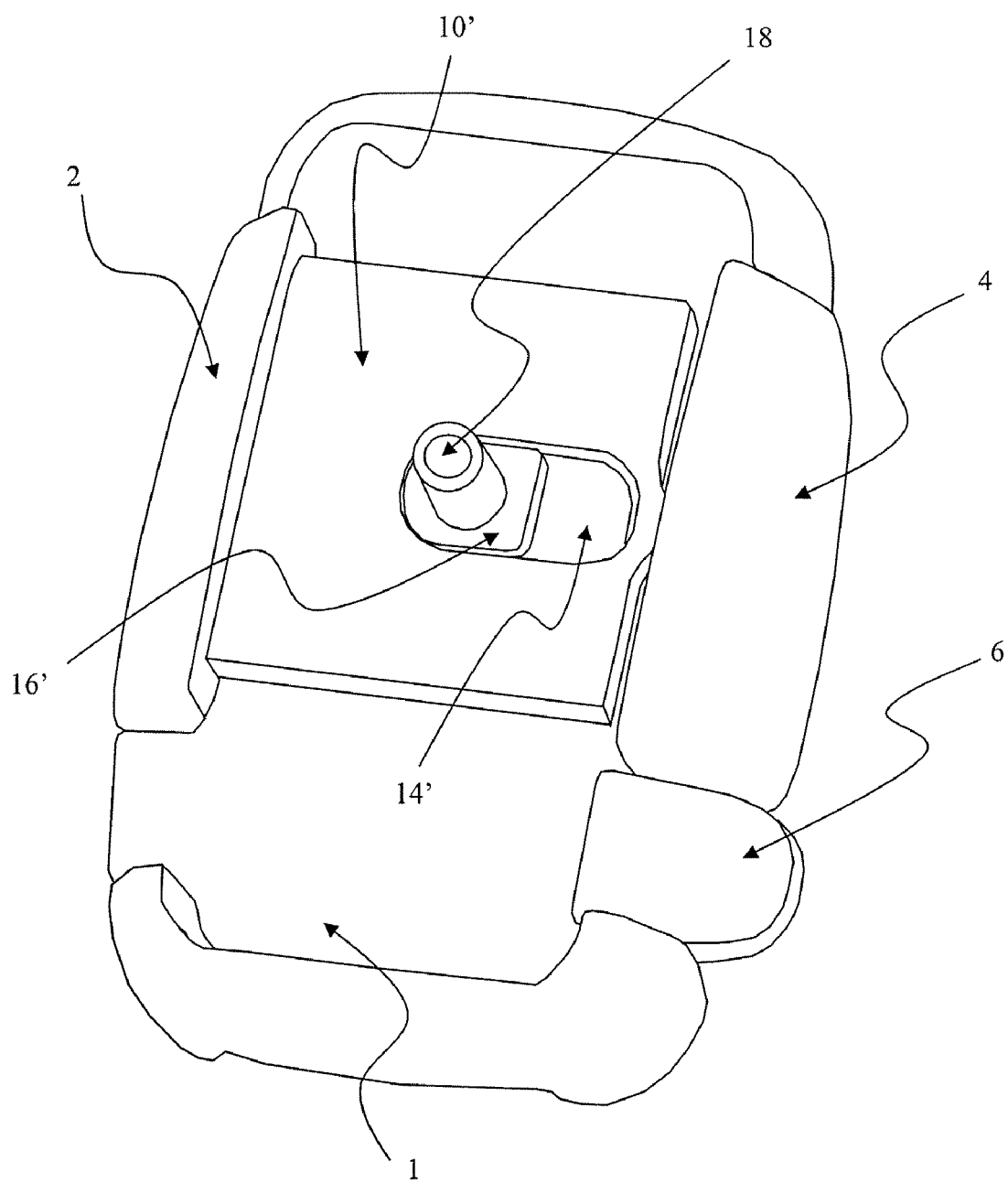
FIG. 2 shows the embodiment of FIG. 1 in a rear view.

FIG. 2 shows the embodiment of FIG. 1 in a view from the rear. The release lever 6 is connected to the plate 10, preferably on this side of the base plate, by a mechanism (not shown) which only allows the clamping jaws 2, 4 to be pushed together, whereby opening of the clamping jaws is made possible only by operation of the release lever 6. The mechanism may be, for example, a catch mechanism or a comparable means. Since those skilled in the art are familiar with such mechanisms, no detailed description is needed here.

A plate 10' corresponding to the plate 10 in FIG. 1 is provided. It is possible here for this plate 10' to be connected to the plate 10 directly or indirectly via the clamping jaw 2 to which it is connected. The plate 10' has a recess 14' which corresponds similarly to the recess 14 from FIG. 1 in which the continuation of the stop element 18 engages. The stop 18 is designed here as a tubular pin but it may also assume other forms, like the corresponding recess.

A damper element 16' corresponding to the damper 16 is mounted on the stop 18, i.e., pulled over it. The damper 16' may be designed in one piece with the damper 16 or it may also be designed as a separate part (in this case 16' refers to the rear side of 16). Therefore, the stop 18 itself cannot be seen in FIG. 1 because it is below the damper 16. The damper 16' functions in the same way as the damper 16.

According to this invention, it is additionally possible for the damper(s) 16/16' to be provided with a coating or shaped contour that produces a certain friction between the damper and the plate, this being provided on the sides of the damper (s) over which the plate 10/10' passes (i.e., on the upper and lower edges in the figures). The movement of the plate(s) and thus of the clamping jaws is therefore additionally damped, preventing an abrupt impact against the stop.

In another embodiment of the present invention, more than one or two damper elements may also be provided to further improve the damping effect. The design is otherwise similar to the variants with one or two damper elements as described above.

The invention claimed is:

1. A holder for a mobile electronic device, comprising:
   a base element;
   a first and a second clamping jaw, mounted on opposing sides of the base element, at least the first clamping jaw being displaceable by a displacement toward the second clamping jaw to clamp the mobile electronic device between the first and the second clamping jaws;
   an elastic element which is connected at least to the first clamping jaw and whose spring force is effective in forcing the first clamping jaw away from the second clamping jaw;
   a locking mechanism which is adapted for locking the first and the second clamping jaws with respect to one another and with respect to the displacement;
   a release element which is adapted for releasing the locking mechanism;
   a stop element located at the base element on an opposite side of the first and second clamping jaws;
   an entraining element which is connected to the first clamping jaw, the entraining element being displaceable with respect to the stop element and designed so that at least one extreme position corresponding to a maximum opening of the clamping jaw is defined in a path of the displacement by a stopping of the stop element against the entraining element; and
   a damper element which is mounted on the stop element and damps the stopping of the stop element against the entraining element.

2. The holder according to claim 1, wherein the second clamping jaw is also displaceable against the first clamping jaw, additionally comprising:
   a second stop element located at the base element at an opposite side of the first and second clamping jaws;
   a second entraining element, which is connected to the second clamping jaw, wherein the second entraining element is displaceable with respect to the second stop element and is designed so that at least one extreme position, which corresponds to a maximum opening of the clamping jaw is defined by a stopping of the second stop element against the second entraining element; and a second damper element, which is mounted on the second stop element and damps the stopping of the second stop element against the second entraining element.

3. A holder according to claim 2, wherein at least one entraining element has a recess in which the corresponding stop element engages.

4. A holder according to claim 3, wherein the recess is an elongated hole and the corresponding stop element is a tubular pin.

5. A holder according to claim 3, additionally comprising:
at least one holding element which is mounted on the base element to prevent a mobile electronic device being held therein from falling out.

6. A holder according to claim 2, additionally comprising:
padding elements which are mounted on the insides of the clamping jaws to protect a mobile electronic device held between the clamping jaws.

7. A holder according to claim 2, additionally comprising:
at least one holding element which is mounted on the base element to prevent a mobile electronic device being held therein from falling out.

8. A holder according to claim 2, wherein the damper elements are elastomer elements.

9. A holder according to claim 2, wherein at least one entraining element is shaped so that another extreme position which corresponds to a minimal opening of the corresponding clamping jaw in the displacement path is also defined by the stopping of the stop element on the entraining element.

10. A holder according to claim 2, wherein the damper elements are in frictional engagement with the corresponding entraining element over at least a portion of the displacement path of the corresponding entraining element.

11. A holder according to claim 1, wherein the entraining element has a recess in which the stop element engages.

12. A holder according to claim 11, wherein the recess is an elongated hole and the stop element is a tubular pin.

13. A holder according to claim 12, additionally comprising:
at least one holding element which is mounted on the base element to prevent a mobile electronic device being held therein from falling out.

14. A holder according to claim 11, additionally comprising:
at least one holding element which is mounted on the base element to prevent a mobile electronic device being held therein from falling out.

15. A holder according to claim 11, wherein the entraining element is shaped so that another extreme position which corresponds to a minimal opening of the first clamping jaw in the displacement path is also defined by the stopping of the stop element on the entraining element.

16. A holder according to claim 1, additionally comprising:
padding elements which are mounted on the insides of the clamping jaws to protect a mobile electronic device held between the clamping jaws.

17. A holder according to claim 1, additionally comprising:
at least one holding element which is mounted on the base element to prevent a mobile electronic device being held therein from falling out.

18. A holder according to claim 1, wherein the damper element is an elastomer element.

19. A holder according to claim 1, wherein the entraining element is shaped so that another extreme position which corresponds to a minimal opening of the first clamping jaw in the displacement path is also defined by the stopping of the stop element on the entraining element.

20. A holder according to claim 1, wherein the damper element is in frictional engagement with the entraining element over at least a portion of the displacement path of the entraining element.

* * * * *

UNITED STATES PATENT AND TRADEMARK OFFICE
CERTIFICATE OF CORRECTION

PATENT NO.        : 7,540,459 B2                                        Page 1 of 1
APPLICATION NO.   : 11/463457
DATED             : June 2, 2009
INVENTOR(S)       : Mitsuhiro Asano, Yasuhiro Yamamoto and Michael Gollnitz It is certified that error appears in the above-identified patent and that said Letters Patent is hereby corrected as shown below:

On the cover page, under (73) Assignee:

Please delete "Nokia Corporation, Epsoo (FI)" and insert --Nokia Corporation, Espoo (FI)--

Signed and Sealed this

Eighteenth Day of August, 2009

David J. Kappos
*Director of the United States Patent and Trademark Office*